(12) United States Patent
Otte et al.

(10) Patent No.: US 12,504,592 B2
(45) Date of Patent: Dec. 23, 2025

(54) OPTICAL ASSEMBLY

(71) Applicant: SICOYA GMBH, Berlin (DE)

(72) Inventors: Sven Otte, Berlin (DE); Stefan Meister, Berlin (DE)

(73) Assignee: SICOYA GMBH, Berlin (DE)

( * ) Notice: Subject to any disclaimer, the term of this patent is extended or adjusted under 35 U.S.C. 154(b) by 252 days.

(21) Appl. No.: 18/038,698

(22) PCT Filed: Nov. 19, 2021

(86) PCT No.: PCT/EP2021/082333
§ 371 (c)(1),
(2) Date: May 24, 2023

(87) PCT Pub. No.: WO2022/117370
PCT Pub. Date: Jun. 9, 2022

(65) Prior Publication Data
US 2024/0053555 A1    Feb. 15, 2024

(30) Foreign Application Priority Data

Dec. 4, 2020   (EP) .................................. 20211848

(51) Int. Cl.
*H04B 10/00*   (2013.01)
*G02B 6/42*    (2006.01)
*G02B 6/43*    (2006.01)

(52) U.S. Cl.
CPC ............. *G02B 6/43* (2013.01); *G02B 6/4246* (2013.01); *G02B 6/4278* (2013.01); *G02B 6/4293* (2013.01)

(58) Field of Classification Search
CPC ...... G02B 6/43; G02B 6/4246; G02B 6/4278; G02B 6/4293; G02B 6/4249; G02B 6/4261; G02B 6/4285
See application file for complete search history.

(56) References Cited

U.S. PATENT DOCUMENTS

| | | |
|---|---|---|
| 6,769,812 B1 | 8/2004 | Handforth et al. |
| 11,178,473 B1 * | 11/2021 | Nagarajan ............... H04B 10/40 |
| 11,432,056 B1 * | 8/2022 | Doerr ..................... G02B 6/421 |

(Continued)

FOREIGN PATENT DOCUMENTS

WO    2020/083845 A1    4/2020

OTHER PUBLICATIONS

Extended European Search Report dated May 31, 2021 issued by the European Patent Office in related European Patent Application No. 20211848.5; filed Dec. 4, 2020.

(Continued)

*Primary Examiner* — Agustin Bello
(74) *Attorney, Agent, or Firm* — Gordon Rees Scully & Mansukhani, LLP (57) ABSTRACT

An exemplary embodiment of the present invention relates to an optical assembly comprising a laser module having a pluggable interface, an optical input-output module having a pluggable interface, and a base module having a first pluggable interface that is pluggably connected to the pluggable interface of the laser module, a second pluggable interface that is pluggably connected to the pluggable interface of the input-output module, and a transceiver optically located between the first and second pluggable interface of the base module.

8 Claims, 6 Drawing Sheets

Network switch assembly which is configurable by pluggable optical input-output module and pluggable laser module (56) References Cited

U.S. PATENT DOCUMENTS

| | | |
|---|---|---|
| 2009/0016685 A1 | 1/2009 | Hudgins et al. |
| 2018/0306990 A1* | 10/2018 | Badihi ................ G02B 6/4448 |
| 2019/0033542 A1* | 1/2019 | Epitaux ............... G02B 6/4226 |
| 2019/0086618 A1* | 3/2019 | Shastri ................ H01R 12/721 |
| 2019/0129112 A1* | 5/2019 | Matiss ................. G02B 6/4292 |
| 2021/0044356 A1* | 2/2021 | Aboagye .............. G02B 6/423 |
| 2021/0194164 A1* | 6/2021 | Epitaux ............... G02B 6/4246 |
| 2021/0263236 A1* | 8/2021 | Janta-Polczynski ........................ G02B 6/3885 |
| 2024/0053555 A1* | 2/2024 | Otte ........................ G02B 6/43 |
| 2024/0385400 A1* | 11/2024 | Oren ................ H01L 23/49816 |

OTHER PUBLICATIONS

International Search Report and Written Opinion dated Feb. 22, 2022 issued by the International Searching Authority in related International Patent Application No. PCT/EP2021/082333; filed Nov. 19, 2021.

* cited by examiner

Figure 1: Network switch assembly which is configurable by pluggable optical input-output module and pluggable laser module Figure 2: Network switch assembly with plugged optical input-output module and laser module Figure 3: Switchbox front plate with 16 optical input-output module cages and 16 laser module cages Figure 6: Input-output module with eight fiber bundles and eight connectors at the external optical interface

OPTICAL ASSEMBLY The present application claims the benefit of and priority to European Patent Application EP 20 211 848.5 filed on Dec. 4, 2020. The foregoing application is incorporated by reference herein in its entirety.

The present invention relates to optical assemblies, sets of optical components for fabricating optical assemblies, and methods of fabricating optical assemblies.

BACKGROUND OF THE INVENTION

Optical assemblies comprising lasers, transceivers, and interface modules are for instance described in the international patent application WO 2020/083845 A1.

OBJECTIVE OF THE PRESENT INVENTION

An objective of the present invention is to propose an optical assembly that can be easily adopted to different customer demands.

A further objective of the present invention is to propose a method of fabricating optical assemblies in compliance with different customer demands.

BRIEF SUMMARY OF THE INVENTION

An exemplary embodiment of the present invention relates to an optical assembly comprising a laser module having a pluggable interface, an optical input-output module having a pluggable interface, and a base module having a first pluggable interface that is pluggably connected to the pluggable interface of the laser module, a second pluggable interface that is pluggably connected to the pluggable interface of the input-output module, and a transceiver optically located between the first and second pluggable interface of the base module.

An advantage of the latter embodiment is that the optical assembly can be used in different technical environments. For instance, laser modules which generate optical radiation with a single wavelength can be easily replaced by other laser modules which generate radiation with different wavelengths, or vice versa. Appropriate interface modules can be assigned to the chosen laser modules by simply replacing existing interface modules, and vice versa. The hardware of the base module may remain the same or be even completely unaffected.

Preferably, the transceiver of the base module is connected to the first pluggable interface of the base module via a first fiber bundle.

Preferably, the transceiver of the base module is connected to the second pluggable interface of the base module via a second fiber bundle.

Preferably, the laser module comprises eight lasers.

Preferably, the first fiber bundle comprises eight fibers.

Preferably, the lasers of the laser module generate radiation of the same wavelengths. Alternatively, the lasers of the laser module may generate radiation with at least two different wavelengths.

The lasers of the laser module may generate radiation having four different wavelengths. In the latter case, two lasers preferably generate radiation having the same wavelength, respectively.

Preferably, the laser module has an optical interface and an electrical interface. The electrical interface may be used to supply electrical power and electrical control signals.

Preferable, the type of the laser module can be reported via the electrical interface.

Preferable, the characteristics of the laser module can be software-controlled via the electrical interface.

Preferable, the current characteristics of the laser module can be reported via the electrical interface.

Preferable, an electrical control unit is connected to the electrical interface of the laser module, the electrical interface of the input-output module and the base module that comprises the transceiver modules as well as preferably other elements of the assembly.

Preferable, the input-output module comprises 64 fibers connected to a pluggable internal interface. Such an interface may be connected to the second fiber bundle of the base module which may comprise 64 fibers.

Preferable, the input-output module also comprises—in addition to its pluggable interface which is hereinafter also referred to as internal optical interface—a second optical interface, hereinafter also referred to as external optical interface. The external optical interface is preferably terminated by one or more pluggable optical connectors.

The external optical interface may be located on the housing of the input-output module. The external optical interface is preferably located on one side of the housing. The pluggable interface (the internal optical interface) is preferably located at the opposite side of the housing.

Alternatively, the external optical interface may terminate one or more fiber bundles, which are connected to the input-output module.

The input-output module may comprise 8 fiber bundles with 8 pluggable optical connectors as the second optical interface.

Preferable, one type of the input-output module, saying type 1, comprises optical multiplexer elements and optical demultiplexer elements for the optical output signal and the optical input signal, respectively.

Preferable, the optical multiplexer multiplexes four wavelengths guided in four different fibers at the internal optical interface to a single fiber, which guides the four different wavelengths to the external interface of the input-output module.

The optical demultiplexer preferably demultiplexes four wavelengths guided in a single fiber at the external optical interface to four different fibers, which guide the four different wavelengths to the internal interface of the input-output module.

Preferable, an input-output module type 1 comprises optical multiplexer and demultiplexer comprising 8 fiber bundles with 2 fibers per bundle, respectively.

Preferable, another type of input-output module, saying type 2, comprises only fibers, which guide the light directly from the internal optical interface to the external optical interface and visa versa.

Preferable, a type 2 input-output module comprises 8 fiber bundles with 8 fibers per bundle, respectively.

Preferably, the input-output module has an internal optical interface and an internal electrical interface. The electrical interface may be used to supply electrical power and electrical control signals.

Preferable, the characteristics of the input-output module can be software controlled via the electrical interface.

Preferable, the type of the input-output module can be reported via the electrical interface.

Preferable, the current characteristics of the input-output module can be reported via the electrical interface.

The invention also relates to a set of optical components for fabricating an optical assembly, preferably an assembly as described above, said set comprising:
- a set of laser modules that comprises at least two different types of laser modules, each of the laser modules having a pluggable interface,
- a set of input-output modules that comprises at least two different types of input-output modules, each of the input-output modules having a pluggable interface,
- a base module having a first pluggable interface that is pluggable to the pluggable interface of each of the laser modules of said set of laser modules, a second pluggable interface that is pluggable to the pluggable interface of each of the input-output modules of said set of input-output modules, and a transceiver located between the first and second pluggable interface.

The optical components of said set of components may be identical with the components described above with respect to the optical assembly.

Each of the laser modules is preferably individually assigned to one or more of the input-output modules and each of the input-output modules is individually assigned to one or more of the laser modules according to a predefined assignment scheme.

The laser modules preferably carry or transmit type-related identification that identifies their respective type of laser module.

The input-output modules preferably carry or transmit type-related identification that identifies their respective type of input-output module.

A control unit implemented in the base module is preferably configured to read the type-related identification of plugged-in laser modules and plugged-in input-output modules.

The control unit is preferably configured to control whether the type of laser module plugged into the first pluggable interface of the base module and the type of input-output module plugged into the second pluggable interface correspond with the predefined assignment scheme.

The control unit is preferably configured to generate an alarm signal if the predefined assignment scheme is violated.

The invention also relates a method of fabricating an optical assembly on the basis of a set of optical components, preferably said set of optical components described above, said method comprising the steps of
- selecting a laser module from said set of at least two laser modules,
- plugging the pluggable interface of the selected laser module into the first pluggable interface of the base module,
- selecting an input-output module from said set of at least two input-output modules, and
- plugging the pluggable interface of the selected input-output module into the second pluggable interface of the base module.

With respect to said method, one or more of the following steps are advantageous:
- each of the laser modules may be individually assigned to one or more of the input-output modules and each of the input-output modules may be individually assigned to one or more of the laser modules according to a predefined assignment scheme,
- the laser modules may carry or transmit type-related identification that identifies their respective type of laser module,
- the input-output modules may carry or transmit type-related identification that identifies their respective type of input-output module,
- a control unit implemented in the base module may carry out the steps of
  - reading the type-related identification of the plugged-in laser module and the type-related identification of the plugged-in input-output module,
  - controlling whether the type of laser module plugged into the first pluggable interface of the base module and the type of input-output module plugged into the second pluggable interface correspond with the predefined assignment scheme, and
  - generating an alarm signal if the predefined assignment scheme is violated.

BRIEF DESCRIPTION OF THE DRAWINGS

In order that the manner, in which the above-recited and other advantages of the invention are obtained, will be readily understood, a more particular description of the invention briefly described above will be rendered by reference to specific embodiments thereof, which are illustrated in the appended figures. Understanding that these figures depict only typical embodiments of the invention and are therefore not to be considered limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings, wherein identical or comparable parts are designated by the same reference signs throughout.

It will be readily understood that the parameters of the embodiments of the present invention, as generally described herein, could vary in a wide range. Thus, the following more detailed description of exemplary embodiments of the present invention, is not intended to limit the scope of the invention but is merely representative of presently preferred embodiments of the invention.

Figure 1:
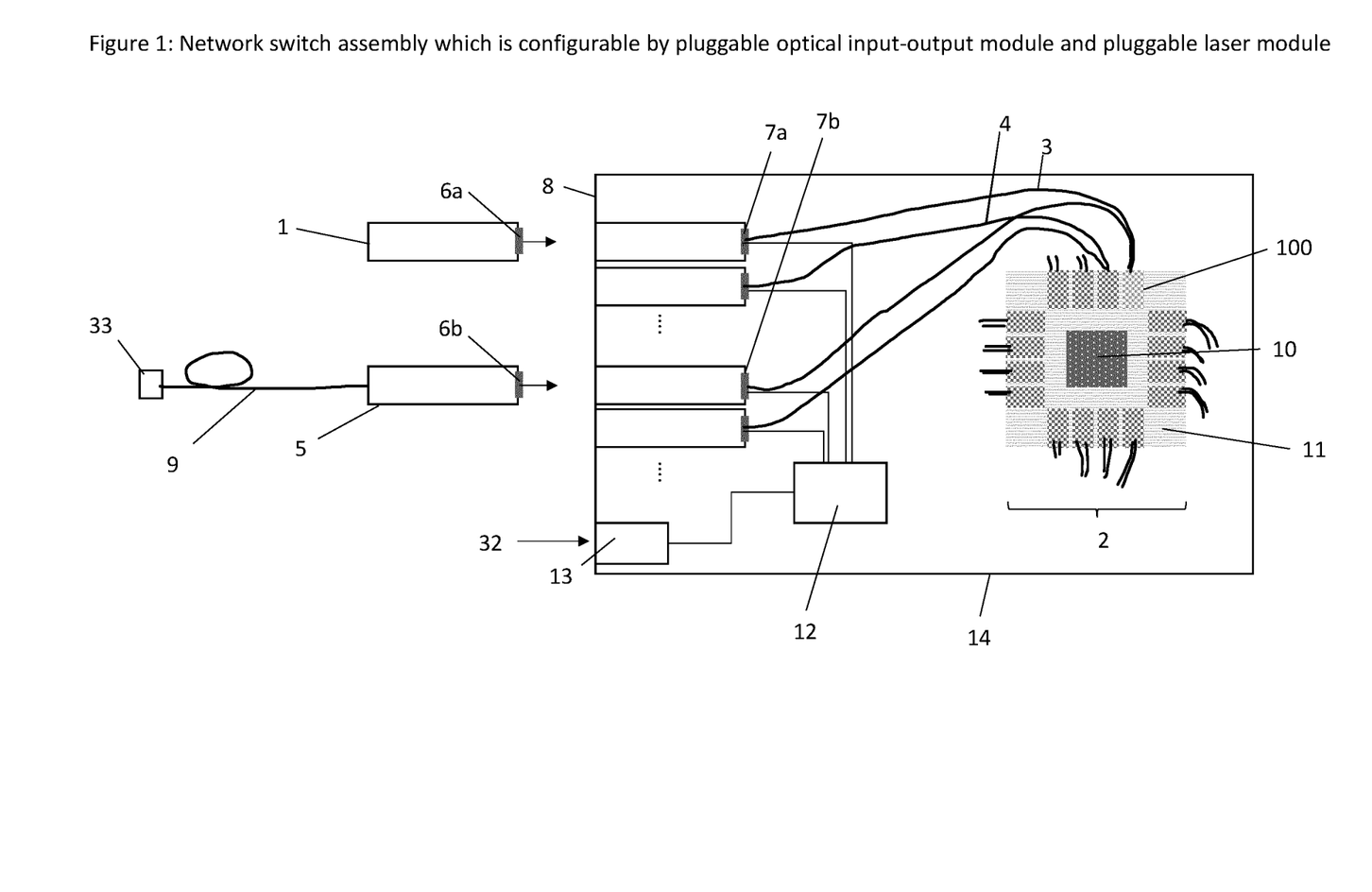
FIG. 1 shows an exemplary embodiment of an optical assembly that comprises a network switch assembly that forms a base module which is configurable by pluggable optical input-output modules and pluggable laser modules.

The description of FIGS. 1-6 refers to the following reference numerals:
1: Laser module
1a: 4 λ laser module with: 8 laser diodes; 2 laser diodes per λ, temperature control element, 1 fiber coupling element/laser diode, optical power control, option ID
1b: Single λ laser module with: 8 laser diodes, e.g 1310 nm, Temperature control element, 1 fiber coupling element/laser diode, optical power control, option ID
1c: Multi-optional laser module with: 8 laser diodes with tuneable wavelengths, temperature control elements, 1 fiber coupling element per laser diode, optical power controls, module option ID
2: Subunit
3: First fiber bundle
4: Second fiber bundle
5: Optical input-output module
5a: Optical input-output module that supports parallel option
5b: Optical input-output module that supports multiplexed option
5c: Optical input-output module that supports multiple options
6a: Pluggable interface of the laser module
6b: Pluggable internal interface of the input-output module
7a: First pluggable interface of the base module provided by a laser module cage
7b: Second pluggable interface of the base module provided by an input-output module cage
8: Switch assembly front plate
9: Fiber bundle of the input-output module
10: Switch ASIC
100: Transceiver module
11: Switch high-speed substrate
12: Control unit
13: Control interface
14: Network switch assembly (base module)
20: Multiplexed optical signal, e.g. FR4 standard compatible
22: Optical multiplexer (MUX) and demultiplexer (DEMUX) element
23a Option ID
23b Option ID
23c Option ID
25: Electrical line to control unit
26: Parallel optical signals, e.g. DR4 standard compatible
27: Optionally Multiplexed optical signals or parallel optical signals
28: Optical Adapter element with may be 64 to 64 fibers
30: Optical switch element which is software configurable between:
 parallel option
 multiplexer (MUX) and demultiplexer (DEMUX) option
 other optical switch options
 attenuation option
31: Control unit with software control functions
32: Control signal
33a-c: External fiber interfaces FIG. 1 shows an exemplary embodiment of an optical assembly that comprises a base module 14. The base module 14 is—because of its characteristics—referred to hereinafter as network switch assembly 14. The network switch assembly 14 is configurable by a pluggable optical input-output module 5 and a pluggable laser module 1.

The network switch assembly 14 comprises a subunit 2 having a switch ASIC 10, sixteen transceiver modules 100, a high-speed substrate 11 and fiber bundles.

Each of the transceiver modules 100 are connected via a first fiber bundle 3 to a first pluggable interface 7a of the network switch assembly 14, and via a second fiber bundle 4 to a second pluggable interface 7b of the network switch assembly 14.

The pluggable laser module 1 comprises an electrical and optical interface 6a that may be plugged into a laser module cage that is provided with the first pluggable interface 7a of the network switch assembly 14 and may therefore get connected to one of the transceiver modules 100. The laser module 1 may be plugged through a front plate 8 of the network switch assembly 14.

The pluggable input-output module 5 comprises an internal electrical and optical interface 6b that may be plugged in an input-output module cage that is provided with the second pluggable interface 7b of the network switch assembly 14 and may therefore get connected to one of the transceiver modules 100.

Furthermore, the pluggable input-output module 5 comprises a second, external optical interface 33. The external optical interface 33 is connected to the internal electrical and optical interface 6b of the pluggable input-output module 5 via fiber bundles 9.

The input-output module 5 may be plugged through the front plate 8 of the network switch assembly 14.

A control unit 12 of the network switch assembly 14 may be electrical connected to the laser module 1 via the interfaces 6a and 7a, to the input-output module 5 via the interfaces 6b and 7b, to a control interface 13 in the front plate 8, and to the subunit 2.

Figure 2:
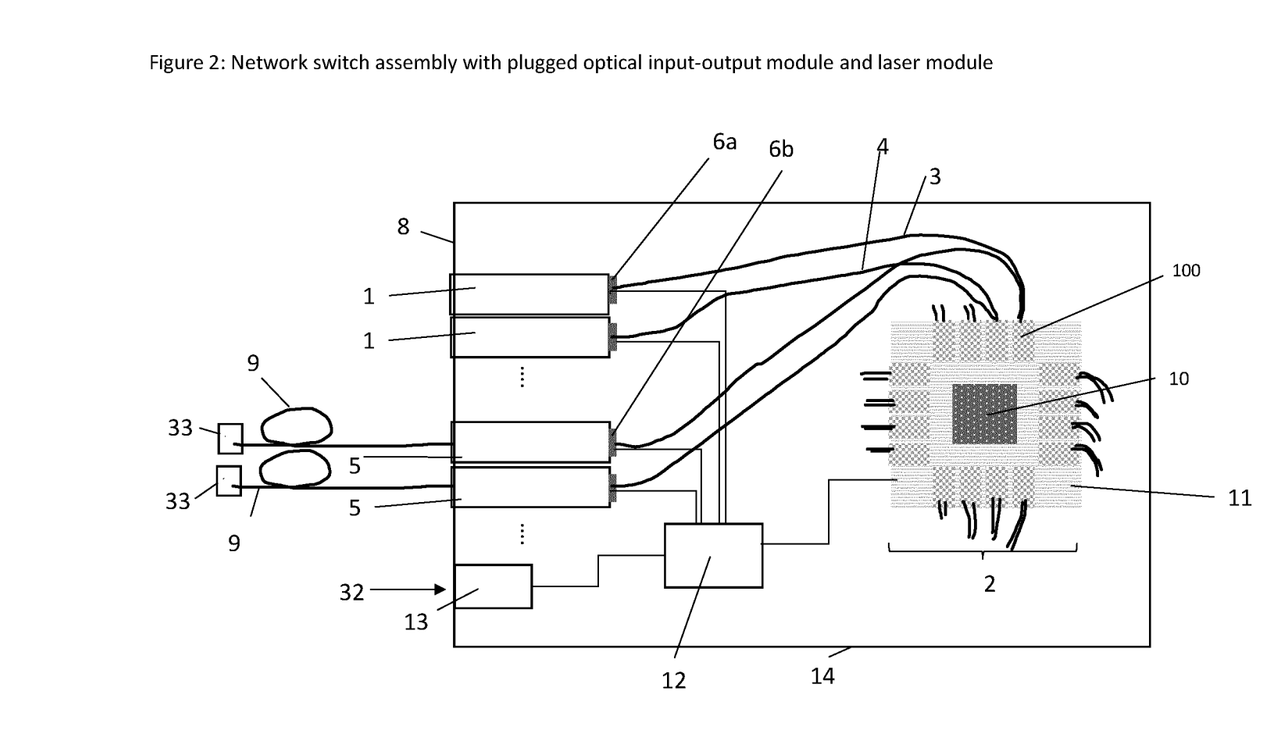
FIG. 2 shows the exemplary embodiment of FIG. 1 after the network switch assembly has been equipped with two optical input-output modules and two laser modules.

FIG. 2 shows the exemplary network switch assembly 14 of FIG. 1 after it has been configured with two plugged-in optical input-output modules 5 and two plugged-in laser modules 1.

Figure 3:
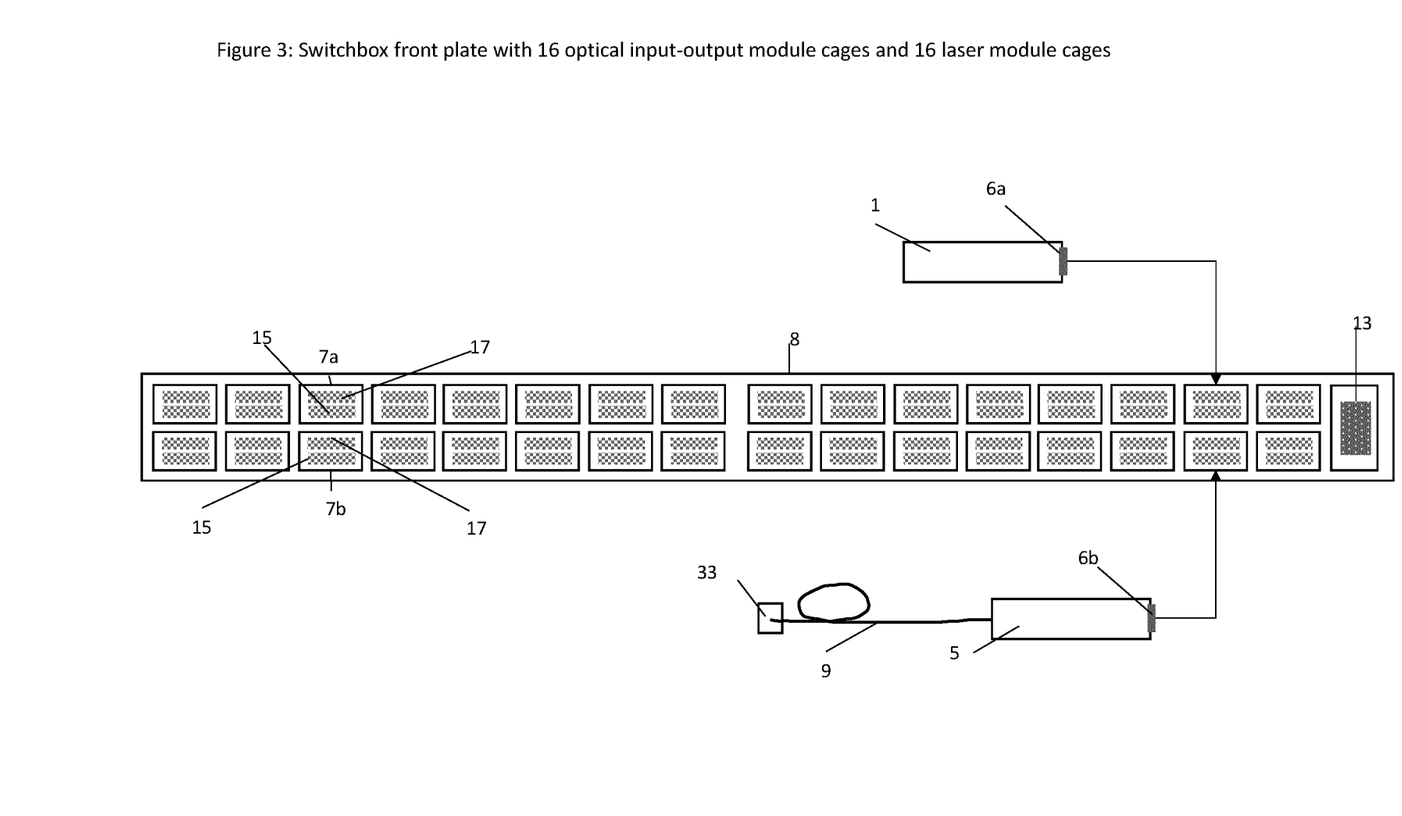
FIG. 3 shows an exemplary front plate of a network switch assembly with sixteen optical input-output module cages and sixteen laser module cages.

FIG. 3 shows the front view of the front plate 8 of the exemplary network switch assembly 14 of FIGS. 1 and 2.

Sixteen laser module cages with interfaces 7a are seen in the top line of the front plate 8. A laser module 1 may plugged in each of the interfaces 7a.

Sixteen input-output module cages with the internal interfaces 7b are seen in the bottom line of the front plate 8. An input-output module 5 may plugged in each of the interfaces 7b. The front plate 8 comprises also a control interface 13.

Figure 4:
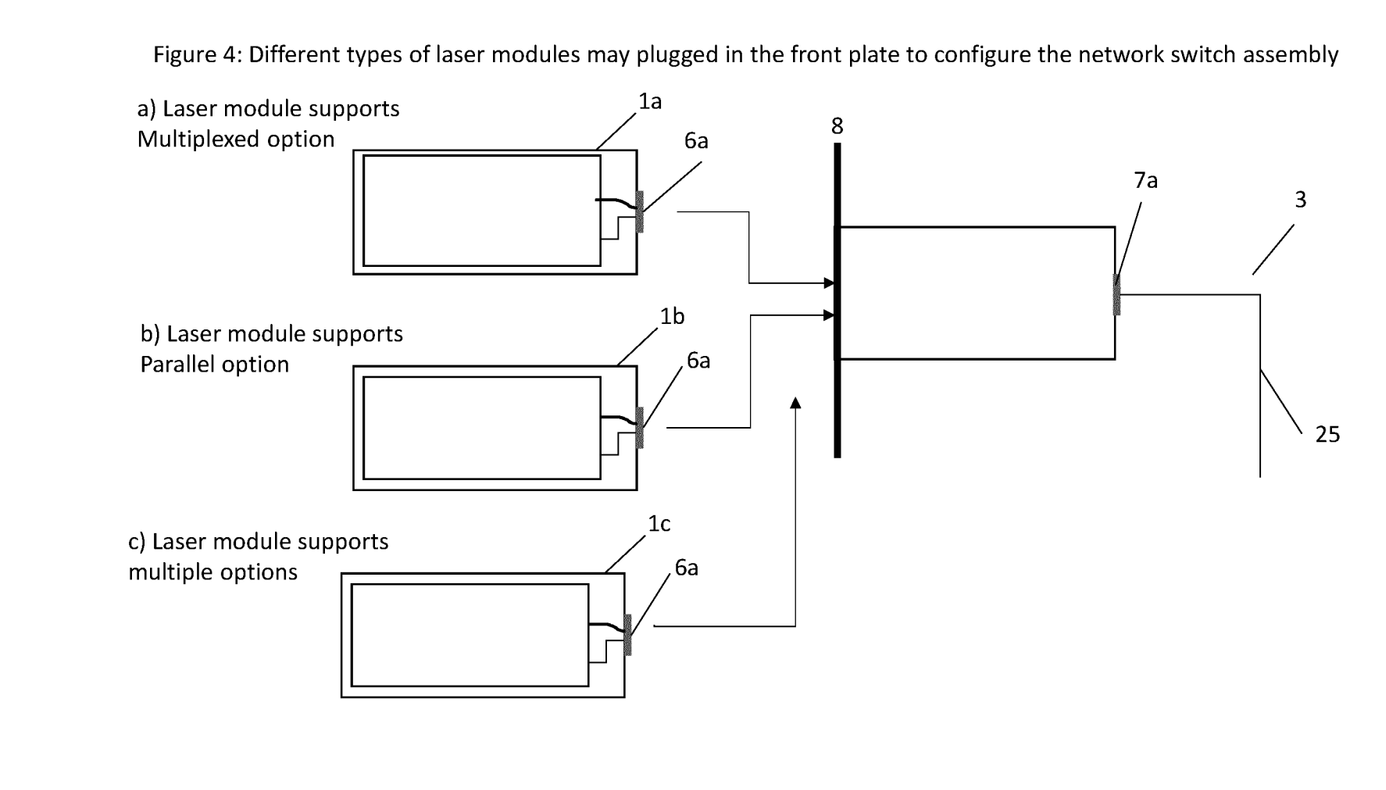
FIG. 4 shows different types of laser modules that may be plugged in the front plate to configure the network switch assembly.

FIG. 4 shows exemplary embodiments of the invention where different types of laser modules 1a, 1b and 1c may be plugged in the laser module cage to configure the network switch assembly 2.

The laser module type 1a is a 4 wavelengths (λ) laser module comprising:
 eight laser diodes, two laser diodes per λ
 a temperature control element
 one fiber coupling element per laser diode
 an optical power control
 a module option ID.

The laser module type 1a may support a so-called multiplexed option with four channels with different wavelengths in a single fiber.

The laser module type 1b is a single wavelength laser module comprising:
 eight laser diodes all with the same wavelength
 a temperature control element
 one fiber coupling element per laser diode
 optical power controls
 module option ID.

The laser module type 1b supports a so-called parallel option with one fiber per channel.

The laser module type 1c is a multi-optional laser module comprising:
  eight laser diodes with tuneable wavelengths
  temperature control elements
  one fiber coupling element per laser diode
  optical power controls
  module option ID.

The laser module type 1c may support parallel as well as multiplexed options with different wavelengths and wavelengths grids.

Figure 5:
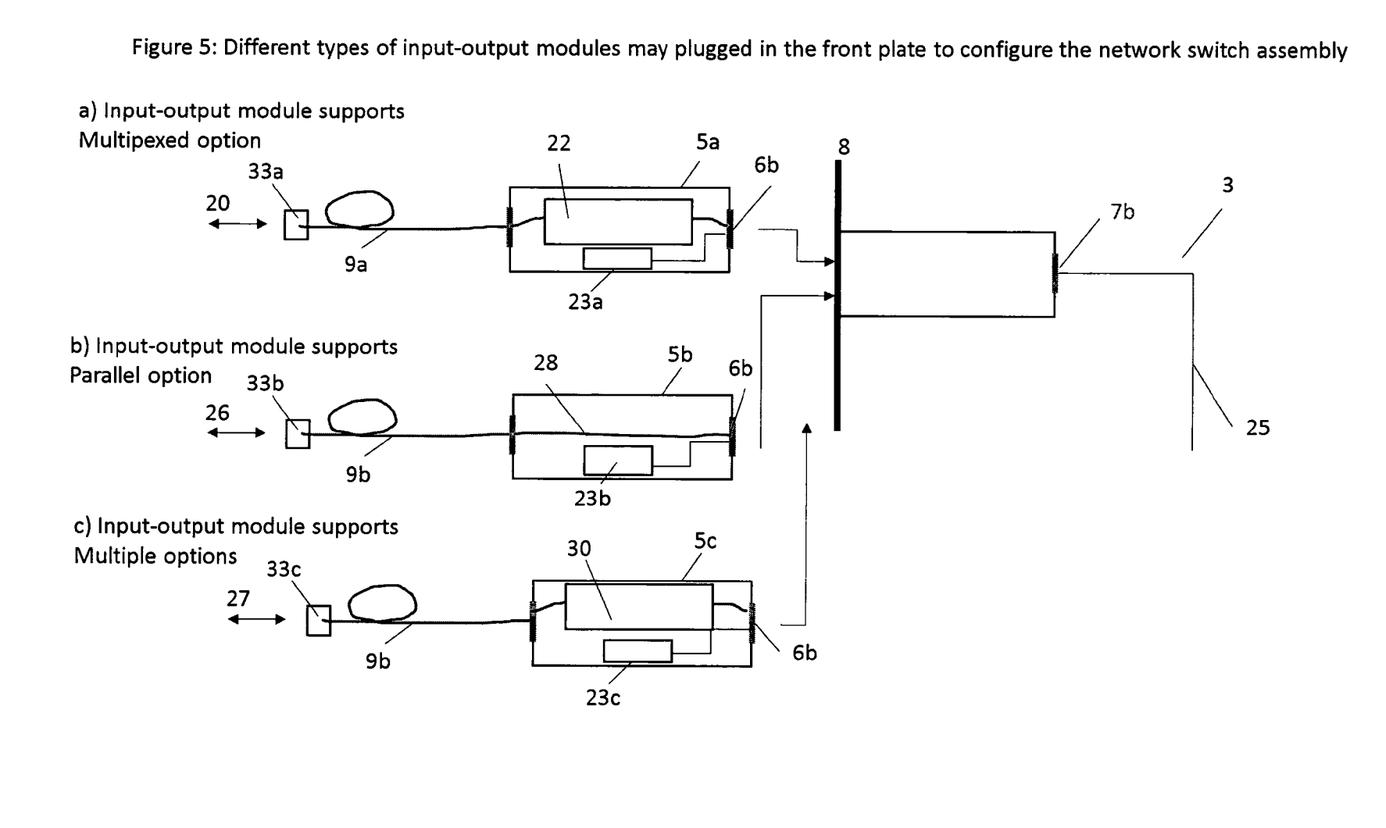
FIG. 5 shows different types of input-output modules that may be plugged in the front plate to configure the network switch assembly.

FIG. 5 shows exemplary embodiments of the invention where different types of input-output modules 5a, 5b and 5c may be plugged in the front plate to configure the network switch assembly.

The input-output module type 5a comprises:—
  an optical multiplexer (MUX) and demultiplexer (DE-MUX) elements 22
  an option ID element 23a
  fiber bundles 9a connecting the input-output module to the external interface 33a comprising eight duplex connectors with two fibers each. The connectors may be LC connectors.

The input-output module type 5a may support a so-called multiplexed option with four channels with different wavelengths in a single fiber. The optical signals 20 are multiplexed optical signals, which may support FR4 (IEEE) standard.

The input-output module type 5b comprises:
  an optical adapter element 28 which guides the fiber bundle 9b directly to the interface of the input-output module 6b
  an option ID element 23b
  fiber bundles 9b connecting the input-output module to the external interface 33b comprising eight connectors with eight fibers each. The connectors may be MPO connectors.

The input-output module type 5b may support a so-called parallel option, where the light of any channel is guided in a separate fiber. The optical signals 26 are parallel optical signals, which may support DR4 (IEEE) standard.

The input-output module type 5c comprises:
  an optical switch element 30 which is software configurable between:
    parallel option
    multiplexer (MUX) and demultiplexer (DEMUX) options
    other optical switch options
    attenuation options
  an option ID element 23c
  fiber bundles 9c connecting the input-output module to the external interface 33c.

The input-output module type 5c may support different options with different fiber configurations. The optical signals 27 may be multiplexed optical signals or parallel optical signals depending on the software-selected option that may be controlled by a control signal 32 via control interface 13 and the control unit 31 (FIG. 2).

Figure 6:
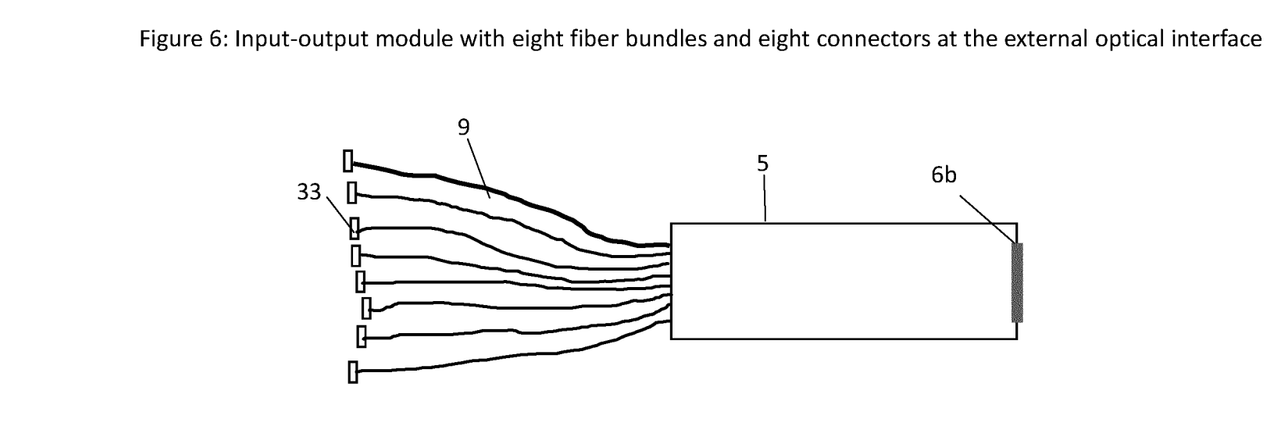
FIG. 6 shows an input-output modules that comprises eight fiber bundles and eight connectors at the external optical interface.

FIG. 6 shows exemplary embodiments of the invention where the pluggable input-output module 5 comprises eight fiber bundles 9 and eight connectors forming the external fiber interface 33.

The above described laser modules type 1a, 1b and 1c as well as the input-output modules type 5a, 5b and 5c may form components of a set of optical components for fabricating an optical assembly according to present invention, for instance as described above.

Each of the laser modules type 1a, 1b and 1c may individually be assigned to one of the input-output module types 5a, 5b and 5c, and vice versa, for instance according to the following assignment scheme:
  Pair 1: laser module type 1a in combination with input-output module type 5a. Pair 1 may be identified by an identification ID1.
  Pair 2: laser module type 1b in combination with input-output module type 5b. Pair 2 may be identified by an identification ID2.
  Pair 3: laser module type 1a in combination with input-output module type 5. Pair 3 may be identified by an identification ID3.

In other words, laser modules may carry or transmit type-related identification ID1, ID2 or ID3 that identifies their respective type of laser module. The input-output modules may carry or transmit type-related identification that identifies their respective type of input-output module.

A control unit implemented in the base module may read the type-related identification ID1-ID3 of plugged-in laser modules and plugged-in input-output modules. The control unit may control whether the type of laser module that is plugged into on of the first pluggable interfaces of the base module, and the type of input-output module that is plugged into the corresponding (optically connected) second pluggable interface, corresponds with the above assignment scheme. The control unit preferably generates an alarm signal if the predefined assignment scheme is violated.

The exemplary embodiments of the present invention described above and/or of other embodiments of the present invention may have one or more of the following features and/or advantages:

In exemplary embodiments of the invention the basic module may comprise a high bandwidth switch ASIC. A switch ASIC and an optical transceiver assembly may be placed on one high-speed substrate so that the electrical connections may be very short for minimum signal distortion.

In exemplary embodiments of the invention the basic module may comprise one or more switch ASICs with an accumulated bandwidth of 51 Tb/s or higher. The bandwidth of a single channel may be 100 Gb/s or higher.

In exemplary embodiments of the invention the basic module may comprise 16 transceiver modules which are co-packaged with the switch ASIC on the same high-speed substrate. The bandwidth of a single transceiver module may be 3.2 Tb/s or higher. The bandwidth of a single channel of a transceiver module may be 100 Gb/s or higher.

In exemplary embodiments of the invention the transceiver modules may be soldered on the high-speed substrate. Alternatively, the transceiver modules may be placed on a second substrate which are soldered or pluggably mounted on the high-speed substrate.

In exemplary embodiments of the invention the fibers in the fiber bundle which connects the transceiver module with the optical input-output module may be in a parallel arrangement, meaning all of the channels are coupled in different fibers.

In exemplary embodiments of the invention 16 optical transceiver modules contain 16 fiber connectors, respectively. Each optical connector on the transceiver module may contain preferable 72 fibers splitted in two separate fiber bundles. 32 receiver fibers and 32 transmitter fibers may connect the transceiver module to the optical input-output module in the second fiber bundle and eight fibers may connect the laser module to the transceiver module in the first fiber bundle.

In exemplary embodiments of the invention the aggregated fiber count of the basic module may be 1152 fibers.

Exemplary embodiments of the invention may comprise polarization maintaining fibers in the first fiber bundle from the laser module to the transceiver module.

In exemplary embodiments of the invention the input-output module 5a may comprise multiple arrangements of optical multiplexers (e.g. 4:1 multiplexers) and optical demultiplexers (e.g. 1:4 demultiplexers). In the latter case, each pluggable optical input-output module may comprise eight such multiplexers as well as demultiplexers guiding the light in eight fiber bundles terminated with eight optical connectors as the external interface of the input-output module. Each of the optical connectors may be terminated with a standard duplex LC connector that comprises a pair of one Tx and one Rx fibers. The signal light passing this connector may support multiplex standards, like IEEE 400GBASE-FR4.

To configure a multiplex option of the network switch assembly 14, the input-output module type 5a may be combined with the laser module type 1a.

To configure a parallel option of the network switch assembly 14, the input-output module type 5b may be combined with the laser module type 1b.

To configure a multiple option of the network switch assembly 14, the input-output module type 5c may be combined with the laser module type 1c.

In exemplary embodiments of the invention the input-output module 5a may comprise an optical adapter element 28. In such an arrangement, 64 fibers guiding the light directly from the internal pluggable interface of the input-output module via eight fiber bundles may be terminated with eight optical connectors as the external interface of the input-output module. Each of the optical connectors may be formed by a standard MPO connector that terminates eight fibers (four Tx and four Rx fibers). The signal light passing this connector may support parallel (one fiber per channel) standards, like IEEE 400GBASE-DR4.

In exemplary embodiments of the invention the input-output modules and the laser modules may be standard form factors often used in network switch assemblies, like QSFP-DD or OSFP pluggable modules.

Exemplary embodiments of the invention may comprise a control unit 12 that may electrical be connected to the laser module 1, to the input-output module 5, to a control interface 13 in the front plate 8 and to the basic module 2. The control unit may read out the status of the pluggable modules and the basic module and furthermore may control via software the characteristics of the pluggable modules as well as the basic module.

In exemplary embodiments of the invention the following characteristics of the laser module may be set via software:
  laser optical power: this defines the reach of the optical data link (e.g. 500 m, 2 km, etc.) and adopt the laser module power consumption.
  the wavelength of the laser diodes.
  the wavelength grid.
  the spectrum of the laser light.

In exemplary embodiments of the invention the following characteristics of the input-output module may be set via software:
  switching between parallel option and multiplexer (MUX) and demultiplexer (DEMUX) options
  other optical switch functionalities
  attenuation options.

Exemplary embodiments of the invention may combine the functionalities and interfaces of both, the input-output module and the laser module, in a single pluggable module. Different types of such pluggable modules then configure the basic module.

Exemplary embodiments of the invention may comprise laser module types, which supports different type of modulators and technologies in the transceiver modules.

Exemplary embodiments of the invention may comprise laser modules with comb laser diodes. The output light from such modules may spectrally shaped as a comb.

In exemplary embodiments of the invention the characteristics of the network switch assembly may be set from outside via the control interface to the requirements of the optical network. Such characteristics may be the optical output power or optical modulation amplitude, the receiver input power, wavelengths, the wavelengths' grid, power consumption of the network switch assembly, etc.

In exemplary embodiments of the invention the network switch assembly comprises a one rack unit (1RU) front plate with at least one row of slots for pluggable laser modules and input-output modules, respectively, that may be either manually configured or through a management interface utilizing tunable versions of the pluggable modules.

In exemplary embodiments of the invention the system may be configured to support either parallel fiber or multiplexed transmission and fiber link lengths from 10 cm to 2 km.

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the word "or" and vice versa, and any combination thereof. The term "pluggably" is inter alia used to express that something is done, for instance coupled or connected, in a pluggable fashion.

In the drawings and specification, there have been disclosed a plurality of embodiments of the present invention. The applicant would like to emphasize that each feature of each embodiment may be combined with or added to any other of the embodiments to modify the respective embodiment and create additional embodiments. These additional embodiments form a part of the present disclosure and, therefore, the applicant may file further patent claims regarding these additional embodiments at a later stage of the prosecution.

Further, the applicant would like to emphasize that each feature of each of the following dependent claims may be combined with any of the present independent claims as well as with any other (one ore more) of the present dependent claims (regardless of the present claim structure). Therefore, the applicant may direct further patent claims towards other claim combinations at a later stage of the prosecution.

The invention claimed is:

1. Method of fabricating an optical assembly on the basis of a set of optical components, said set of optical components comprising a set of laser modules that comprises at least two different types of laser modules, each of the laser modules having a pluggable interface, a set of input-output modules that comprises at least two different types of input-output modules, each of the input-output modules having a pluggable interface, a base module having a first pluggable interface that is pluggable to the pluggable interface of each of the laser modules of said set of laser modules, a second pluggable interface that is pluggable to the pluggable interface of each of the input-output modules of said set of input-output modules, and a transceiver located between the first and second pluggable interface, wherein each of the laser modules is individually assigned to one or more of the input-output modules and each of the input-output modules is individually assigned to one or more of the laser modules according to a predefined assignment scheme, wherein the laser modules carry or transmit type-related identification that identifies their respective type of laser module, wherein the input-output modules carry or transmit type-related identification that identifies their respective type of input-output module, wherein a control unit implemented in the base module is configured to read the type-related identification of plugged-in laser modules and plugged-in input-output modules, wherein the control unit is configured to control whether the type of laser module plugged into the first pluggable interface of the base module and the type of input-output module plugged into the second pluggable interface correspond with the predefined assignment scheme, and wherein the control unit is configured to generate an alarm signal if the predefined assignment scheme is violated, said method comprising the steps of:

selecting a laser module from said set of at least two laser modules, plugging the pluggable interface of the selected laser module into the first pluggable interface of the base module, selecting an input-output module from said set of at least two input-output modules, and plugging the pluggable interface of the selected input-output module into the second pluggable interface of the base module, wherein said control unit implemented in the base module carries out the steps of reading the type-related identification of the plugged-in laser module and the type-related identification of the plugged-in input-output module, controlling whether the type of laser module plugged into the first pluggable interface of the base module and the type of input-output module plugged into the second pluggable interface correspond with the predefined assignment scheme, and generating an alarm signal if the predefined assignment scheme is violated.

2. The method of claim 1, wherein one type of the input-output module comprises optical multiplexer elements and/or optical demultiplexer elements for the optical output signal and the optical input signal, respectively, and wherein another type of input-output module comprises only fibers, which guide the light directly from the internal optical interface to the external optical interface and vice versa.

3. The method of claim 1, wherein said set of laser modules comprises at least two of the following types of laser modules:

a four wavelengths laser module comprising eight laser diodes, two laser diodes per wavelength and one fiber coupling element per laser diode, wherein this laser module type supports a so-called multiplexed option with four channels with different wavelengths in a single fiber at the external optical interface of the input-output module;

a single wavelength laser module comprising eight laser diodes all with the same wavelength and one fiber coupling element per laser diode, wherein the latter laser module type supports a so-called parallel option with one fiber per channel at the external optical interface of the input-output module;

a multi-optional laser module comprising eight laser diodes with tuneable wavelengths and one fiber coupling element per laser diode wherein the latter laser module type supports parallel as well as multiplexed options at the external optical interface of the input-output module with different wavelengths and wavelengths grids.

4. The method of claim 2, wherein said set of laser modules comprises at least two of the following types of laser modules:

a four wavelengths laser module comprising eight laser diodes, two laser diodes per wavelength and one fiber coupling element per laser diode, wherein this laser module type supports a so-called multiplexed option with four channels with different wavelengths in a single fiber at the external optical interface of the input-output module;

a single wavelength laser module comprising eight laser diodes all with the same wavelength and one fiber coupling element per laser diode, wherein the latter laser module type supports a so-called parallel option with one fiber per channel at the external optical interface of the input-output module;

a multi-optional laser module comprising eight laser diodes with tuneable wavelengths and one fiber coupling element per laser diode wherein the latter laser module type supports parallel as well as multiplexed options at the external optical interface of the input-output module with different wavelengths and wavelengths grids.

5. Set of optical components for fabricating an optical assembly comprising:

a set of laser modules that comprises at least two different types of laser modules, each of the laser modules having a pluggable interface, a set of input-output modules that comprises at least two different types of input-output modules, each of the input-output modules having a pluggable interface, a base module having a first pluggable interface that is pluggable to the pluggable interface of each of the laser modules of said set of laser modules, a second pluggable interface that is pluggable to the pluggable interface of each of the input-output modules of said set of input-output modules, and a transceiver located between the first and second pluggable interface wherein, each of the laser modules is individually assigned to one or more of the input-output modules and each of the input-output modules is individually assigned to one or more of the laser modules according to a predefined assignment scheme, wherein the laser modules carry or transmit type-related identification that identifies their respective type of laser module, wherein the input-output modules carry or transmit type-related identification that identifies their respective type of input-output module, wherein a control unit implemented in the base module is configured to read the type-related identification of plugged-in laser modules and plugged-in input-output modules, wherein the control unit is configured to control whether the type of laser module plugged into the first pluggable interface of the base module and the type of input-output module plugged into the second pluggable interface correspond with the predefined assignment scheme, and wherein the control unit is configured to generate an alarm signal if the predefined assignment scheme is violated.

6. The set of claim 5, wherein one type of the input-output module comprises optical multiplexer elements and/or optical demultiplexer elements for the optical output signal and the optical input signal, respectively, and wherein another type of input-output module comprises only fibers, which guide the light directly from the internal optical interface to the external optical interface and vice versa.

7. The set of claim 5, wherein said set of laser modules comprises at least two of the following types of laser modules:

a four wavelengths laser module comprising eight laser diodes, two laser diodes per wavelength and one fiber coupling element per laser diode, wherein this laser module type supports a so-called multiplexed option with four channels with different wavelengths in a single fiber at the external optical interface of the input-output module;

a single wavelength laser module comprising eight laser diodes all with the same wavelength and one fiber coupling element per laser diode, wherein the latter laser module type supports a so-called parallel option with one fiber per channel at the external optical interface of the input-output module;

a multi-optional laser module comprising eight laser diodes with tuneable wavelengths and one fiber coupling element per laser diode wherein the latter laser module type supports parallel as well as multiplexed options at the external optical interface of the input-output module with different wavelengths and wavelengths grids.

8. The set of claim 6, wherein said set of laser modules comprises at least two of the following types of laser modules:

a four wavelengths laser module comprising eight laser diodes, two laser diodes per wavelength and one fiber coupling element per laser diode, wherein this laser module type supports a so-called multiplexed option with four channels with different wavelengths in a single fiber at the external optical interface of the input-output module;

a single wavelength laser module comprising eight laser diodes all with the same wavelength and one fiber coupling element per laser diode, wherein the latter laser module type supports a so-called parallel option with one fiber per channel at the external optical interface of the input-output module;

a multi-optional laser module comprising eight laser diodes with tuneable wavelengths and one fiber coupling element per laser diode wherein the latter laser module type supports parallel as well as multiplexed options at the external optical interface of the input-output module with different wavelengths and wavelengths grids.

* * * * *